INVENTOR
KARL BREUER

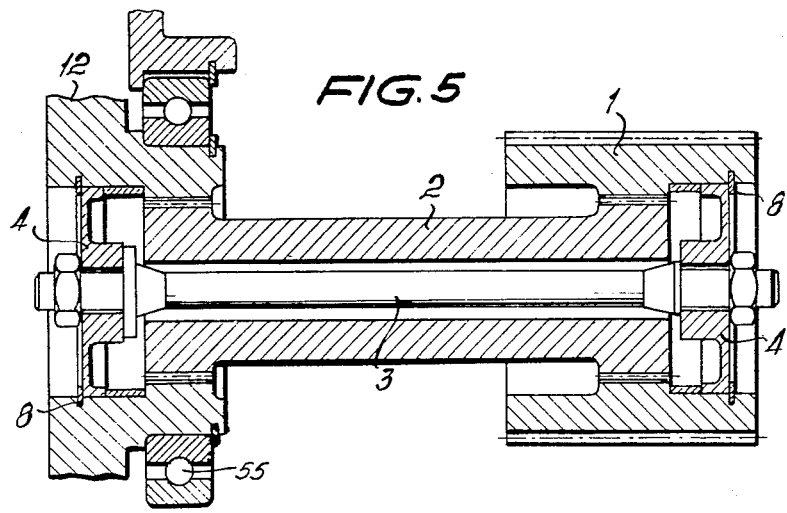
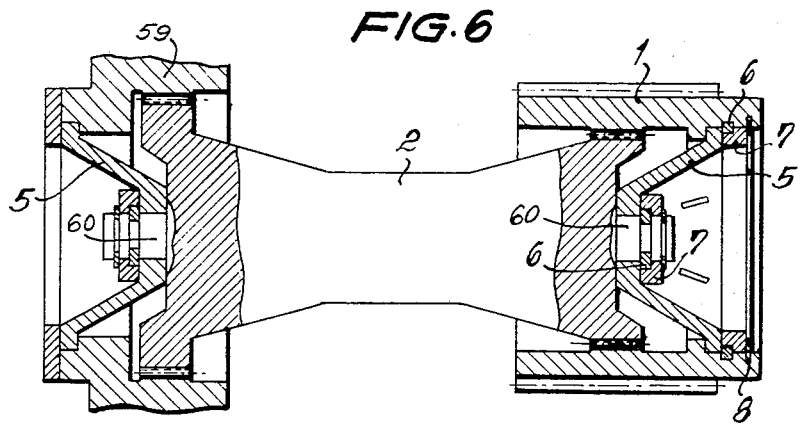

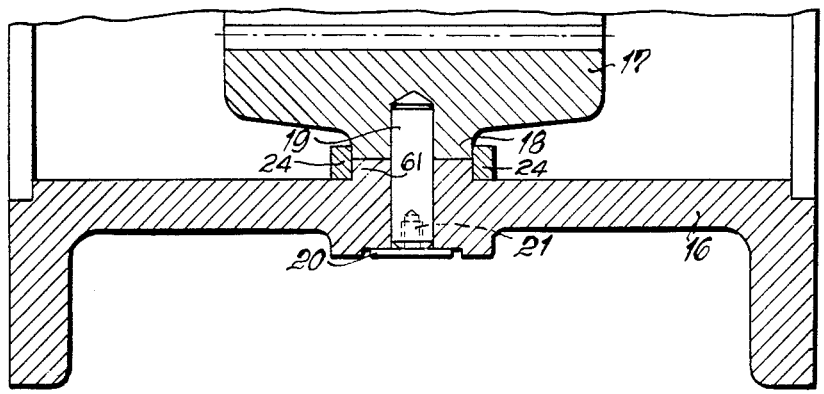

United States Patent Office 3,244,020
Patented Apr. 5, 1966

3,244,020
GEAR CONSTRUCTIONS
Karl Breuer, Duisburg, and Curt Kronert, Mulheim, Germany; said Breuer assignor to Demag Aktiengesellschaft, Duisburg, Germany
Filed Apr. 11, 1962, Ser. No. 186,697
Claims priority, application Germany, Apr. 11, 1961, D 35,826
14 Claims. (Cl. 74—411)

This invention generally relates to gear constructions and is particularly directed to the mounting and arrangement of gear wheels having both outer and inner gears or gear surfaces for use in planetary gear constructions.

In recent times, serious efforts have been made in the gear construction art to built gears which are lighter in weight and smaller in dimensions than the usual prior art constructions. The tendency, therefore, has been to construct gears which are operative at a plurality of locations so that a single gear can be active and perform work in various directions and at spaced apart locations. Thus, for example, a single pinion may mesh with two or even more gears so that the output is tapped at spaced locations. As is well known, however, the tolerances of pinions and gears in general are not exact and difficulties are encountered in exactly mounting and aligning gears. If the gear is to mesh with several other gears at spaced locations, any misalignment in mounting or inaccuracy in manufacture will, of course, affect the operation of the gears. Particularly, the driving and driven shafts on which the gears are mounted will operate unsatisfactorily if the torque is transmitted to them in unsymmetric manner and serious errors with regard to shaft alignment, etc. will take place. Thus, any inaccuracy in the original manufacture of the gears and in the mounting of the gears may ultimately lead to destruction and break down.

Simple pinions and gears with inclined tooth surfaces render it possible to build gear constructions with smaller dimensions than is possible with arrow or herringbone shaped gear teeth. Further, such simple gears having teeth with inclined surfaces are preferred if the gears have to operate at high speed because axial oscillations are minimized. However, as is well known in the art, such simple gears have to absorb other axial forces such as axial stresses and shearing forces. Various constructions have become known in the art in order to minimize contact errors resulting from axial forces. Thus, it has been proposed to construct the connecting shafts or driving shafts for such simple pinions and gears in the form of torsion bar spring shafts in order, in this manner, to obtain an elastic yieldance of the pinions and gears. However, torsion bar spring shafts require a substantial length and for this reason gearings wherein the individual gears are mounted on such resilient shafts are of substantial dimensions in axial direction and therefore are expensive to construct. It has also been suggested to overcome the last-mentioned drawback by providing yielding or resilient gear couplings, particularly if the available longitudinal dimension for the gearings is short. Thus, driving and connecting shafts have been proposed wherein the gear adjustment is yieldingly performed by means of gear couplings. However, in the case of simple pinions or gears with inclined teeth surfaces, gear couplings with straight teeth are not suitable, as axial forces such as stresses and shearing forces are not absorbed by the inclined teeth surfaces of the pinions and gear wheels. Proposals to provide so-called Seeger or other retaining or spring rings for the intended purpose have failed because the provision of such rings makes the gearing construction excessively expensive and moreover causes excessively large tooth flank pressures. Moreover, the production of such gearings is extremely difficult and cumbersome and axial safety rings which by necessity are required in such construction wear out within a short period of time.

The invention overcomes the drawbacks of the known constructions referred to and for this purpose provides means for, on the one hand, effectively transmitting the torque from one gear to the other, and on the other hand, for absorbing any axial forces which may occur.

Therefore, it is a primary object of this invention to provide mounting means for gear constructions of planetary gears having different gear surfaces at spaced locations wherein any inexactness in the production of the gears and/or in the mounting of the gears is overcome and compensated for.

Another object of this invention is to provide a planetary gearing arrangement which has means for absorbing axial forces such as thrust, stress and shearing forces without friction or play and with a minimum of counter forces or resistance.

Principally, the above objects are accomplished by providing elastic means and members in a manner to be explained in detail hereinbelow.

A further aspect of this invention is concerned with the mounting of an outer gear having an inner gear surface of a gearing construction wherein the outer gear serves as a supporting member. As previously mentioned, such gearings are difficult to manufacture and require considerable expenditure in order to attain the exactness of construction and mounting and the required tolerances to assure unobjectionable functioning of the gear elements. Even if the gears are manufactured with great exactness, small errors cannot be avoided, and if the gears contain a plurality of gear surfaces and the various gear surfaces are to co-act in a gear system, such errors tend to be cumulative so that considerable misalignment takes place. In addition, the bearings tend to become worn and unsatisfactory operation and functioning of the gear system is caused. The errors referred to may thus result not only in disturbing noise but may cause rapid wear of the individual gears and may result in ultimate destruction of the individual elements of the gearing.

Therefore, according to a further feature of this invention, gear elements of planetary gearings which are stationarily arranged within a housing and which have interior gear surfaces are mounted in a novel means. This is accomplished by the provision of springily elastic members which accomplish the mounting of such gear elements within the housing of the gearing. This aspect of the invention also applies to gear rims of planetary gear elements, in which case these gear rims are constructed in such a manner that those portions of the gear rim surfaces which are secured to the housing referred to constitute themselves elastic means or members.

According to one embodiment of the invention, gear wheels having interior gear surfaces can be secured within the gear housing by means of a web which is centrally arranged at the gear wheel at the side of the wheel which is devoid of a gear surface. In such embodiment, the web or collar of the gear rim is provided with bores which extend in the axial direction of the gearing. The bores, in turn, are lined with bushings which receive a plurality of bolts carrying the gear rim. The bushings which are provided in the bores may consist of an elastic material so that the gear rim or tooth surface is resiliently and yieldingly suspended within the gear housing. Spacer bushings which are arranged on both sides of the web and which are pushed onto the bolts referred to then hold the gear rim in the correct axial distance.

According to a further modification of this basic concept, the mounting or securing of the gear rim may be obtained within the housing by means of shearing or breaking bolts which engage in the elastic and yielding web or collar of the stationary gear wheel by means of bores which are distributed over the circumference of the wheel. Axial support and guiding of the gear rim in this case is obtained by means of abutments which are distributed at the housing circumference and engage on both sides of the web. These shearing or breaking bolts, however, are mounted in tempered or hardened sleeves or bushings which latter have an interrupted portion in the region of the desired breaking areas of the bolts between the web bolts and the inner wall of the housing. The hardened sleeves engage on the inner wall of the housing in gliding manner, so that upon breakage of the bolts caused by overload, the gear wheel body proper is moved along and any destruction of the gearing is prevented.

According to a still further modification of the invention, the gear rim webs may be mounted or supported on springy elements which are mounted in an annular groove provided within the housing so that an optimum tooth contact is obtained in the gearing system even if the load on the gearing is non-uniform. In that event, the optimum tooth contact will occur over the entire width and the entire circumference of the gearing while the gearing will run in quiet and smooth manner.

In accordance with a still further embodiment of the invention, and for the purpose of overcoming or at least minimizing any disadvantages which result from inaccuracies in the teeth configuration of the gears and/or from misalignment of the bearings, it is proposed to construct those housing walls which extend in axial direction of the gearing and which carry the gear rims and/or provide them with an inner gear surface with varying wall thicknesses. In addition, it is within the scope of this invention to provide such walls with recesses which, however, do not traverse the entire wall thickness. In such an embodiment, the interior gear rim surfaces of the outer gear wheels are centrally arranged at the housing wall and are secured thereto. The thus elastically constructed housing wall of the gearing carries advantageously centrally the web of the gear rim of an outer gear wheel having an interior gear surface. In such a construction, the intended effect is increased and the outer gear referred to compensates, if arranged on the housing wall in the manner described, for any inaccuracies or errors which may result from inexact gear construction or mounting. However, it is also possible to arrange the outer gear wheels within the housing on a pot member or pot wheel which is rendered elastic by means of cut-out or recess portions. In further modifying this embodiment, and for the purpose of improving the functioning of the gears, the remaining gears of the gearing, that is, also the sun and intermediate or central gears, may be constructed in such a manner that any errors are compensated for or eliminated and that the individual gears are protected with regard to destructive consequences caused by overload. For this purpose, the gear bandages or rims of such gear wheels are secured by means of springily elastic members on the gear wheel bodies proper. As springily elastic members, bolts may be used which, by means of spring pressure, are pressed against the gear bandages or into recesses within the gear bandages. It is also feasible for this purpose to use resilient members, as for example, annular springs or resilient shafts which are inserted in recesses between the teeth bandages and the gear wheel bodies and resiliently hold the gear teeth bandages on the gear wheel bodies.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 5 is a cross section through a multi-part pinion, the figure also illustrating the mounting of the pinion;

FIG. 6 is a cross section through a pinion of a different embodiment;

FIG. 7 is a cross section through a mounting arrangement of a gear having an inner gear surface or rim;

Figure 1:
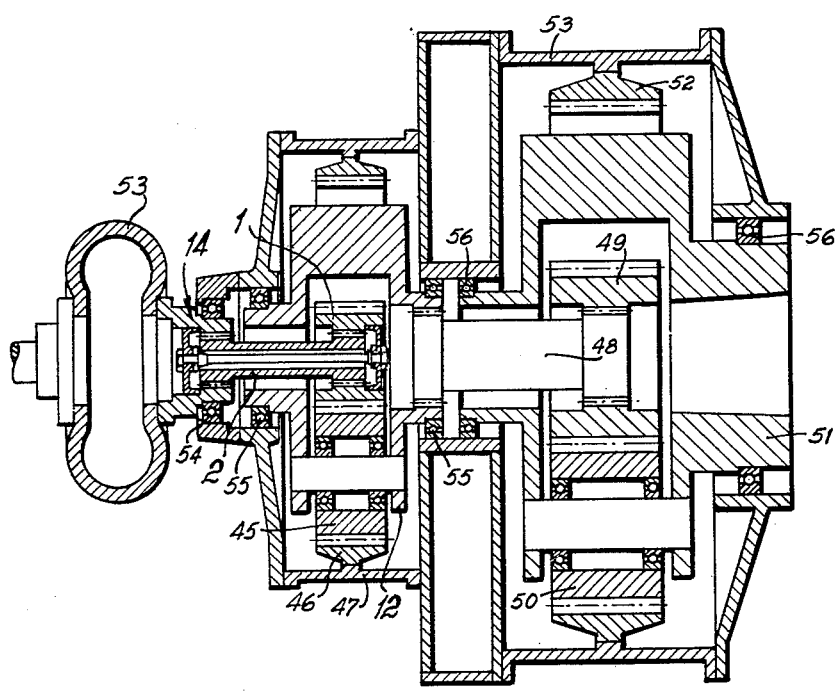
FIG. 1 is a cross section through a two-stage planetary gearing which is operative at two locations, i.e. the output is tapped at two locations.

In the planetary gearing illustrated in FIG. 1, the input torque is applied through a flexible coupling 53 to a transmission member or coupling 14. A preferably tubular shaft 2 has one end splined to intermesh with internal splines on the member 14 so as to be rotated therewith, the shaft 2 thus being supported only in the member 14 which is, in turn, supported in a bearing 54. Shaft 2, being supported only at one end, may be termed a cantilever shaft which has a free end spaced a substantial distance axially from its supported end. The free end of shaft 2 is splined to interengage with an internally splined sun pinion 1. Due to the relative springiness of shaft 2 by virtue of its support at only one end, pinion 1 has a degree of freedom of movement in a radial direction. Due to its splined interconnection with shaft 2, the pinion 1 also has a degree of freedom of axial movement.

Pinion 1 meshes with one or more planet gears 45 which are rotatably supported in a carrier 12. Carrier 12 is, in turn, rotatably supported in bearings 55. Planet gears 45 mesh with an internal ring gear 46 which has a somewhat yieldable but rotation preventing connection to a casing portion 47.

The gearing illustrated in FIG. 1 is a double reduction planetary gearing. For this reason, the right-hand end of carrier 12 is internally splined to provide a splined interconnection with the left-hand end of a shaft 48. Shaft 48 is also supported only at its left end so that its right end has a degree of freedom of movement in a radial direction. The right end of shaft 48 is splined to form a splined interconnection between shaft 48 and a second sun gear or pinion 49. Sun pinion 49 likewise has a degree of freedom of movemet in a radial direction due to the relative springiness of the cantilever support of the shaft 48. Pinion 49 also has a degree of freedom of movement in an axial direction.

Sun pinion 49 meshes with planet pinions or gears 50 which are rotatably mounted in a carrier 51, and carrier 51 is rotatably supported in axially spaced bearings 56. Planet gears 50 mesh with an internal ring gear 52 which has a yielding but rotation preventing connection with a casing portion 53. The output may be derived from the carrier 51 although it is known, in planetary gearing, to derive the output either from the carrier 51 or from one or more of the planet gears 50.

It will be noted that each of the sun pinions 1 and 49 is supported upon the free end of a cantilever drive shaft, such as 2 or 48, to which each sun pinion is splined for a degree of freedom of movement in an axial direction in addition to the degree of freedom of movement in a radial direction. It will be noted further that the planetary gearing shown in FIG. 1 is of the type which, due to the internal ring gears being stationary, involves rotation of the carriers for the planetary gears when the sun pinions are rotated. Thus as sun pinion 1 is rotated, the planet pinions 45 are rotated and roll around the internal ring gear 46. In turn, this induces rotation of carrier 12 about the axis of shaft 2.

Figure 2:
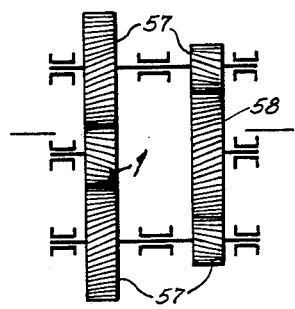
FIG. 2 is a diagrammatic representation of this gearing.
Figures 3, 4:
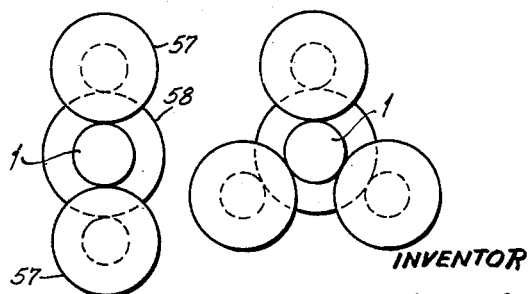
FIG. 3 is an end view of the gearing.
FIG. 4 is an end view of a planetary gearing which is operative at three locations (triple tapping)

FIGS. 2, 3 and 4 schematically illustrate various types of planetary gearings which operate in the same manner as does the planetary gearing of FIG. 1. In the arrangement of FIG. 2, sun pinion 1, through the rotatable pinion pairs 57, drives an output gear 58. This particular drive is illustrated in schematic end elevation in FIG. 3. An equivalent arrangement involving three planetary pairs is illustrated in schematic end elevation in FIG. 4.

FIG. 5 illustrates the drive shaft 2 and the planet 1 of FIG. 1 in a much larger scale. The arrangement herein illustrated corresponds more nearly to the second stage of the planetary gearing of FIG. 1. The shaft 2, which is tubular and somewhat springy or elastic, is splined at each end. At its left end, shaft 2 has a splined driving connection with carrier 12 which is rotatably mounted in bearings 55. The right end of shaft 2 has a splined driving connection with sun pinion 1. An elastic bolt 3 extends coaxially through the tubular shaft 2 and serves to absorb the axial forces. Carrier 12 and gear 1 have relatively flexible hub webs 4, and the ends of bolt 3 extend through these hub webs and are threaded to receive nuts. Thereby, the bolt 3 restrains carrier 12 and pinion 1 from relative axial displacement away from each other. The hub webs 4 are retained in place by Seeger or snap rings 8. It should be noted that the hub webs 4 are capable of flexure.

FIG. 6 illustrates an alternative embodiment in which the shaft 2' has a solid cross-section and is provided with reduced diameter extensions 60 at its axis. Shaft 2' is further splined at each end, so that its left end has a splined supporting interconnection with a coupling 59 and its right end has a splined interconnection with pinion 1. Each of hub 59 and pinion 1 is provided with a frusto-conical hub web 5 which is retained in position by Seeger or snap rings 8 with the interposition of spacer rings 6 and 7. The small diameter extensions 60 are similarly formed so as to receive snap rings 8 and spacer rings 6 and 7 to lock the hub webs 5 against the ends of the shaft 2'. The hub webs 5 serve to transmit axial forces.

A feature of the invention is the yieldable connection between the internal ring gear of the planetary gearing and a casing, whereby further radial and axial forces may be absorbed. In the arrangement shown in FIG. 7, a casing or housing is indicated at 16 and the internal ring gear of the planetary gearing at 17. The external surface of internal ring gear 17 is formed with a circumferentially extending and relatively narrow shoulder or web 18 which bears against an internal shoulder or reinforcement 61 of casing 16. Rings 24 maintain ring gear 17 against axial displacement relative to casing 16.

At substantially the diametric central plane through the shoulder 18 and the reinforcement 61, this shoulder and the reinforcement are formed with correspondingly located radial bores or apertures which are spaced uniformly of the circumference. These apertures receive springy or elastic bolts or pins 19 which are retained in position by a retaining ring 20 which extends around the exterior surface of casing 16 and is secured by studs or bolts 21 to each of the pins 19. The elastic pins 19 enable a movement of internal ring gear 17 relative to casing 16 of an extent sufficient, although of a small order, to enable ring gear 17 to accommodate any misalignment of the parts.

Various advantageous arrangements for elastically or resiliently mounting the internal ring gear are shown in FIGS. 8a through 8e. In each case, cutouts or recesses 32 are distributed along the circumference of the inner surface of casing 16, while corresponding cutouts or recesses 33 are distributed along the outer surface of internal ring gear 17. These cutouts or recesses serve the purpose of accommodating springily elastic or radially movable means.

Figure 8A:
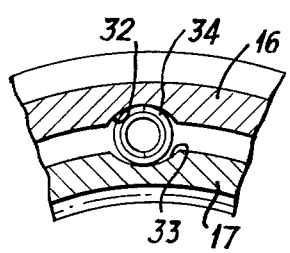
FIGS. 8a–8e are partial radial sectional views illustrating different embodiments of a mounting means for an internal ring gear.
Figure 8B:
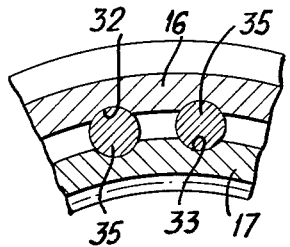
Figure 8C:
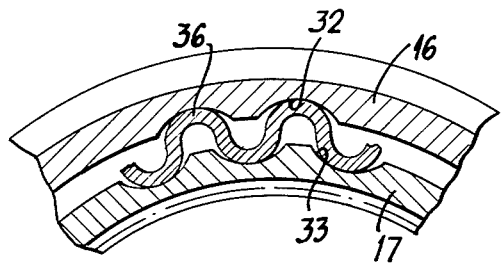
Figure 8D:
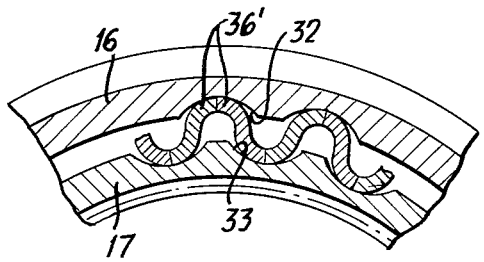
Figure 8E:
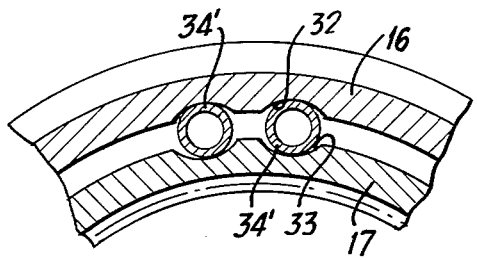

In FIG. 8a, such means is illustrated as coil springs 34, and in FIG. 8b, this means is illustrated as resilient bolts 35. In FIG. 8c, the springily elastic means is illustrated as sinusoidal springs 33, and in FIG. 8d, there is a modification comprising individual springs 36' conjointly forming sinusoidal springs. In FIG. 8e, the springily elastic means is illustrated as resilient tubes 34'.

Figure 9:
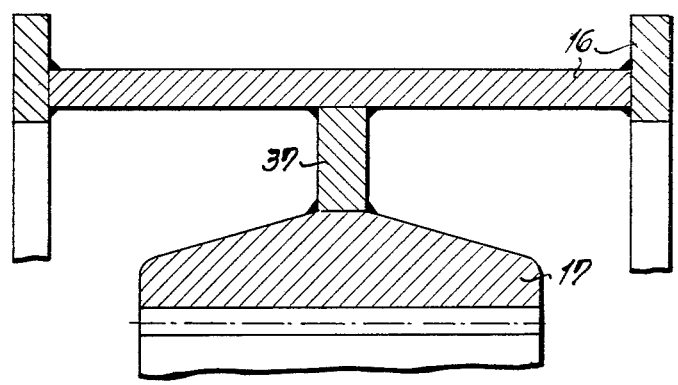
FIG. 9 is a section like FIG. 7 of still a further embodiment.

In the arrangement of FIG. 9, the stationary internal ring gear 17 is connected to the casing 16 by means of a relatively thin annular web 37 lying in a diametric plane. Web 37 may be welded to casing 16 and to internal ring gear 17, and acts as a resilient or elastic interconnection between casing 16 and ring gear 17 to allow the latter to adjust to accommodate misalignment and the like.

While specific embodiments of the invention have been shown and described in detail to illustrate the application of the inventive principles, it will be understood that this invention may be embodied otherwise without departing from such principles.

What is claimed is:

1. A planetary gearing comprising, in combination, a substantially central sun gear; a casing; a carrier rotatably supported in said casing and coaxial with said sun gear; an internal ring gear coaxial with said sun gear; planetary pinions rotatably mounted on said carrier and meshing with said sun gear and said internal ring gear; a relatively elongated drive shaft rotatably supported at one end only in said casing and displaceable axially; means forming a splined interconnection between the free end of said drive shaft and said sun gear to provide for limited axial and radial play of said sun gear to absorb stresses and accommodate misalignment of parts; means forming a yieldable rotation preventing connection between said ring gear and said casing to provide for limited movement of said ring gear to absorb stresses and accommodate misalignment of parts; a coupling rotatably mounted in said casing; said one end of said drive shaft having a splined interconnection with said coupling; means restraining relative axial separation of said coupling and said sun gear; said means for restraining such relative axial separation comprising flexible web members respectively anchored in said coupling and in said sun gear; and means coaxial with said shaft interconnecting said flexible web members.

2. A planetary gearing, as claimed in claim 1, in which said drive shaft is tubular; said means interconnecting said flexible web members comprising an elastic bolt extending coaxially and freely through said tubular drive shaft; said bolt absorbing radial stresses exerted on said sun gear, coupling and drive shaft whereby said drive shaft is subjected to substantially only torque stresses.

3. A planetary gearing, as claimed in claim 1, in which said means interconnecting said flexible web members comprises coaxial reduced diameter extensions on the ends of said drive shaft extending through central apertures in said flexible web members; and means anchoring said extensions to said web members.

4. A planetary gearing, as claimed in claim 1, in which said web members extend in substantially a diametrical plane.

5. A planetary gearing, as claimed in claim 1, in which said flexible web members are substantially frusto-concial and converge toward the ends of said drive shaft.

6. A planetary gearing comprisnig, in combination, a substantially central sun gear; a casing; a carrier rotatably supported in said casing and coaxial with said sun gear; an internal ring gear coaxial with said sun gear; planetary pinions rotatably mounted on said carrier and meshing with said sun gear and said internal ring gear; a relatively elongated drive shaft rotatably supported at one end only in said casing and displaceable axially; means forming a splined interconnection between the free end of said drive shaft and said sun gear to provide for limited axial and radial play of said sun gear to absorb stresses and accommodate misalignment of parts; means forming a yieldable rotation preventing connection between said ring gear and said casing to provide for limited movement of said ring gear to absorb stresses and accommodate misalignment of parts; said means forming a yieldable rotation preventing connection comprising relatively elastic means interconnecting the rim of said internal ring gear and said casing; the rim of said ring gear being formed with a substantially central external web; said web and said casing being correspondingly apertured at circumferentially spaced locations; said elastic means comprising elastic pins extending through aligned apertures in said web and in said casing; and means anchoring said pins in position.

7. A planetary gearing comprising, in combination, a substantially central sun gear; a casing; a carrier rotatably supported in said casing and coaxial with said sun gear; an internal ring gear coaxial with said sun gear; planetary pinions rotatably mounted on said carrier and meshing with said sun gear and said internal ring gear; a relatively elongated drive shaft rotatably supported at one end only in said casing and displaceable axially; means forming a splined interconnection between the free end of said drive shaft and said sun gear to provide for limited axial and radial play of said sun gear to absorb stresses and accommodate misalignment of parts; means forming a yieldable rotation preventing connection between said ring gear and said casing to provide for limited movement of said ring gear to absorb stresses and accommodate misalignment of parts; said means forming a yieldable rotation preventing connection comprising relatively elastic means interconnecting the rim of said internal ring gear and said casing; said elastic means comprising a relatively thin web extending diametrically of said internal ring gear and disposed between the periphery of said ring gear and said casing; and means anchoring said web to each of said ring gear and said casing.

8. A planetary gearing comprising, in combination, a substantially central sun gear; a casing; a carrier rotatably supported in said casing and coaxial with said sun gear; an internal ring gear coaxial with said sun gear; planetary pinions rotatably mounted on said carrier and meshing with said sun gear and said internal ring gear; a relatively elongated drive shaft rotatably supported at one end only in said casing and displaceable axially; means forming a splined interconnection between the free end of said drive shaft and said sun gear to provide for limited axial and radial play of said sun gear to absorb stresses and accommodate misalignment of parts; means forming a yieldable rotation preventing connection between said ring gear and said casing to provide for limited movement of said ring gear to absorb stresses and accommodate misalignment of parts; said means forming a yieldable rotation preventing connection comprising relatively elastic means interconnecting the rim of said internal ring gear and said casing; said elastic means comprising cooperating arcuate cross-sectioned recesses extending longitudinally of said casing and said ring gear, on the inner surface of said casing and on the outer surface of said ring gear; and coupling means extending longitudinally between said casing and said ring gear and seated in recesses in both thereof.

9. A planetary gearing, as claimed in claim 8, in which said coupling means comprises arcuately sinusoidal spring elements.

10. A planetary gearing, as claimed in claim 8, in which said coupling means comprises elastic pins.

11. A planetary gearing, as claimed in claim 8, in which said coupling means comprises coil springs.

12. A planetary gearing comprising, in combination, a sun gear; a casing; a carrier rotatably supported in said casing and coaxial with said sun gear; an internal ring gear coaxial with said sun gear; planetary pinions rotatably mounted on said carrier and meshing with said sun gear and said internal ring gear; said pinions and said gears having tooth formations providing for relative axial displacement of said pinions and said gears due to torque reaction; a driving element; and a relatively rigid torque transmitting shaft, a flexible resilient relatively elongated tie means, and flexible elements, all interposed between and interconnecting said sun gear and said driving element; said shaft being rotatably supported only at its end adjacent said driving element and serving solely to transmit the torque of said driving element to said sun gear; said flexible resilient tie means and said flexible elements transmitting axial thrust forces between said sun gear and said driving element without friction and play and with only a minimum reaction.

13. A planetary gearing, as claimed in claim 12, in which said torque transmitting shaft is tubular; said relatively elongated tie means comprising a tie rod extending through said tubular shaft, and said flexible elements being connected to said tie rod.

14. A planetary gearing, as claimed in claim 12, in which said flexible elements connect opposite ends of said shaft to said driving element and said sun gear.

References Cited by the Examiner

UNITED STATES PATENTS

| | | | |
|---|---|---|---|
| 326,941 | 9/1885 | Brown | 64—15 |
| 865,486 | 9/1907 | Gannon | 64—29 |
| 1,778,170 | 10/1930 | Smith et al. | 64—12 |
| 2,698,526 | 1/1955 | Beier | 74—411 |
| 2,701,456 | 2/1955 | Brownstein | 64—15 |
| 2,703,021 | 3/1955 | Stoeckicht | 74—411 |
| 2,801,552 | 8/1957 | Stubbings et al. | 74—411 |
| 2,871,681 | 2/1959 | Beecher | 64—9 |
| 2,900,848 | 8/1959 | Henn-Collins | 74—768 |
| 2,956,451 | 10/1960 | Bowman | 74—411 |
| 2,976,704 | 3/1961 | Kleinschmidt | 64—28 |
| 3,011,365 | 12/1961 | Stoeckicht | 74—410 |
| 3,041,857 | 7/1962 | Anderson et al. | 64—13 |
| 3,115,204 | 12/1963 | Dence | 74—769 |

FOREIGN PATENTS

| | | |
|---|---|---|
| 567,059 | 5/1958 | Belgium. |
| 1,028,761 | 4/1958 | Germany. |

DON A. WAITE, *Primary Examiner.*

BROUGHTON G. DURHAM, *Examiner.*